April 5, 1932.    E. W. PAPE    1,852,087

ADJUSTABLE EXTENSION BROILER

Filed Dec. 9, 1929

INVENTOR.
EDWARD W. PAPE
BY Arthur C. Eckert
ATTORNEY.

Patented Apr. 5, 1932

1,852,087

UNITED STATES PATENT OFFICE

EDWARD W. PAPE, OF ST. LOUIS, MISSOURI

ADJUSTABLE EXTENSION BROILER

Application filed December 9, 1929. Serial No. 412,676.

The object of my device is to make an adjustable extension broiler to be used in gas or coal ranges. In operation it becomes necessary for the housewife to manipulate the conventional broiler pan in the broiling operation. The article broiled must be turned over and the juices from the article broiled together with the gravy poured over the article being broiled. In addition it is necessary to place the article to be broiled in the broiler pan and then position the broiler pan in the broiler and remove the broiler pan from the broiler when the operation is completed. These operations are very difficult to perform in the instance of the conventional broiler. In order to perform these operations, it is necessary to at least partially remove the broiler pan from the broiler. Since the broiler pan is hot, this is a delicate operation and very frequently results in the burning of the hand or fingers of the operator. By the use of my device, the broiler pan is extended forwardly and upwardly from the broiler to a position where the greater portion of the broiler pan extends outwardly from the broiler. In this position the operations indicated and others that may be necessary may be conveniently performed. The operation of extending and elevating the broiler pan is simple and can be accomplished without the danger of burning the operator's hands. Furthermore, it is desirable to be able to vary the distance between the broiler pan and the source of heat or burners in the broiler. If the broiling operation is to proceed rapidly, the broiler pan must be positioned close to the flame. If the broiling operation is to proceed slowly, the distance between the broiling pan and the flame must be increased. By the use of my device, the broiling pan may be raised or lowered conventionally within the advantageous limits. This raising and lowering is accomplished by the mere manipulation of a rod protruding from the front of the range frame.

With these and other objects in view, my invention has relation to certain novel features of construction and arrangement of parts as will be hereinafter more fully described, pointed out in the claims and illustrated in the drawings in which Fig. 1 is a fragmental front elevation of a range showing the broiler with my device positioned in the broiler.

Figure 1:
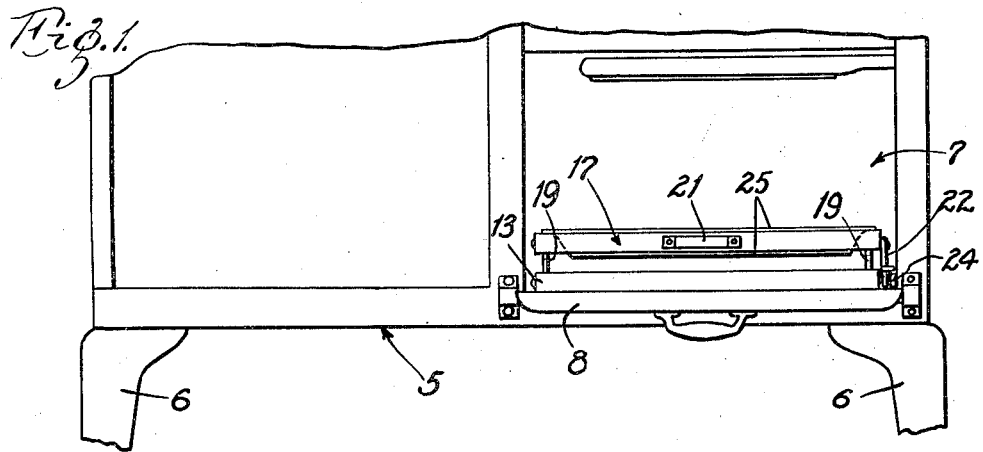

Numeral 5 designates the range generally, having the legs 6 and the broiler compartment 7. Numeral 8 designates the door to the broiler compartment showing it in its open or horizontal position. The structure thus far described is conventional.

Numeral 9 designates a rectangular frame forming the floor of the broiler compartment 7. The frame is formed of angle irons 10 and is of a size to fit conveniently in the broiler compartment. Connecting the front and rear ends of the rectangular frame 9 in the center is formed the rib 11. Numeral 12 designates a longitudinal slot formed in the rib 11. Numeral 13 designates a sliding rectangular frame made of angle irons 14 and of the same size as the rectangular frame 9. Numeral 15 designates a fragmental longitudinal rib connecting with the rear end of the sliding frame 13 centrally over the longitudinal slot 12 of the rib 11. Numerals 16 designate rivets or bolts passing through holes in the rib 15 and extending through the longitudinal slot 12 of the rib 11, so that the heads are beneath the slots.

It will be seen that by this arrangement that the sliding frame 13 is in sliding engagement on the rectangular frame 9 longitudinally. That is, when the sliding frame 13 is moved longitudinally, the rivets 16 slide in the longitudinal slot 12 of the rib 11. Numeral 17 designates a rectangular elevating frame made of angle irons 18 and of the same size and shape as the rectangular frame 9 and the sliding frame 13. In order to secure the rectangular elevating frame 17 to the sliding frame 13, the arms 19 are employed. I have illustrated four such arms. Each arm is pivotally secured to the longitudinal member of the sliding frame 13 and to the longitudinal member of the rectangular elevating frame 17. The arms 19 are mounted so as to be continually in a state of parallelism. The arms 19 opposite each other are in the same plane. It will be seen, therefore, that in any position of the rectangular elevating frame 17 relative the sliding frame 13, that the planes of these two frames will be parallel and that when the plane of the rectangular frame 9 is horizontal, which is the case in practice, that the sliding frame 13 and the rectangular elevating frame 17 will always be in horizontal planes.

Numerals 20 designate rods connecting opposite arms 19 in order to assure their constant spaced relationship and to add rigidity to the structure.

Numeral 21 designates a handle secured to the front end of the rectangular elevating frame 17. It will be seen that by the structure thus far described that when the sliding frame 13 is moved to its outward limiting position and the rectangular elevating frame 17 is moved to its outward position, that the rectangular elevating frame 17 will be projected in front of the plane of the front wall of the range 5. It will be likewise seen that the distance between the planes of the rectangular elevating frame 17 and the sliding frame 13 may be varied by rotating the arms 19 on their pivotal points. It will also be seen that the forward limiting position is reached when the forward arms 19 come in contact with the vertical portion of the front angle iron 14 of the sliding frame 13. It will also be seen that the maximum height that may be obtained by the rectangular elevating frame 17 relative the sliding frame 13 is obtained when the arms 19 are in vertical planes. It will also be observed that the arms 19 are of such length and so positioned that when the rectangular elevating frame 17 is brought to its extreme inward position it is lying flatly on the sliding frame 13. It will also be seen that when these frames are in this position and are moved to their inward position assumed in Fig. 1 of the drawings, that none of the device will protrude outwardly from the broiler compartment 7 and that in this position the door of the broiler compartment 8 may be closed. In order to positively secure the position of the rectangular elevating frame 17 relative the sliding frame 13 selectively, the arm 22 is provided, which is pivotally secured at its inner end to the rear end of one side of the frame of the rectangular elevating frame 17. The free end of the arm 22 has the notches 23 formed thereon. To the one side forwardly positioned is secured the pin 24. The pin 24 is of such size as to permit its easy frictional engagement in the notches 23. It will be seen, therefore, that when any particular notch of the notches 23 is notched on the pin 24, that the relative position of the rectangular elevating frame 17 and the sliding frame 13 is secured. The free end of the arm 22 extends outwardly so that it may be easily grasped and removed from one notch and positioned in another notch. A conventional broiler pan 25 is detachably secured in the ordinary way to the rectangular elevating frame 17.

It will be seen that when my device is not in use and the door 8 of the broiler compartment closed, that the entire structure is not visible and for that reason cannot mar the appearance of the range. It will also be observed that when my structure is positioned in the broiler compartment 7, as shown in Fig. 1, that it occupies a very small amount of space. It is to be understood that the heat from the flame of the range passes through the spaces in the rectangular frame 9 and the sliding frame 13.

The operation of the device is obvious. When it is desired to position an article to be broiled in the broiler after the broiler door 8 is opened, the handle 21 is grasped and a pulling force applied until the sliding frame 13 has reached its maximum forward position, which will be realized by the operator on account of his inability to further pull it; a continued pull on the handle 21 will then elevate the rectangular elevating frame 17 and at the same time move the rectangular elevating frame 17 forwardly to its most forward position. It must be understood, however, that the maximum elevation of the rectangular elevating frame 17 is not coincident with its maximum forward position because, as previously described, the maximum elevation is reached when the arms 19 are in their vertical positions, and that is before the rectangular elevating frame 17 has reached its maximum extended position.

Figure 2:
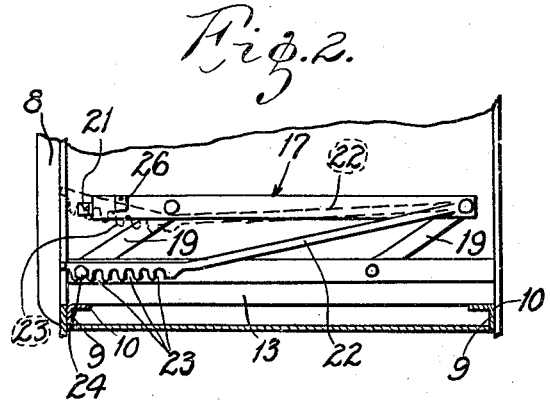
Fig. 2 is a fragmental side elevation of the floor and front and rear of the broiler with my device positioned therein.
Figure 3:
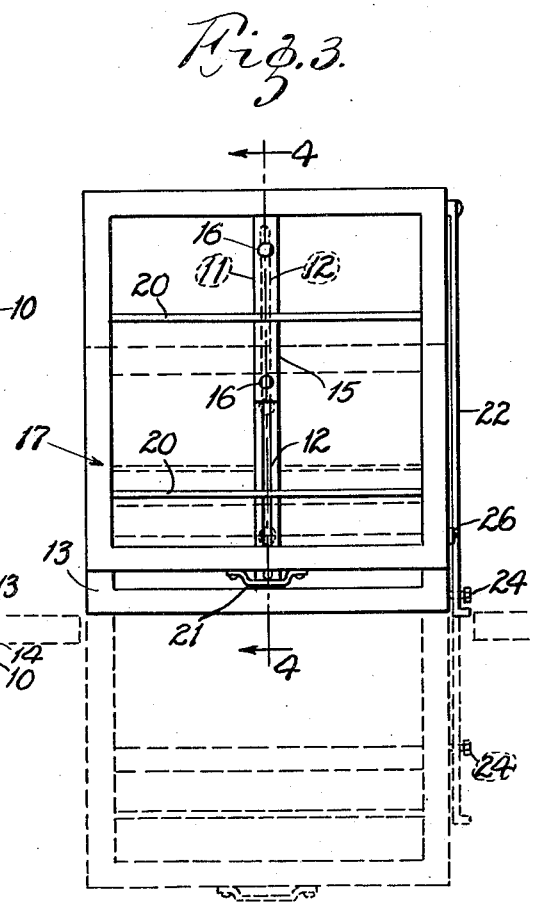
Fig. 3 is a plan view of my device showing its position relative the front wall of the range and showing my device in the position it assumes when entirely in the broiler compartment of the range in solid line and the position it shows in its forward extended position in dash lines.
Figure 4:
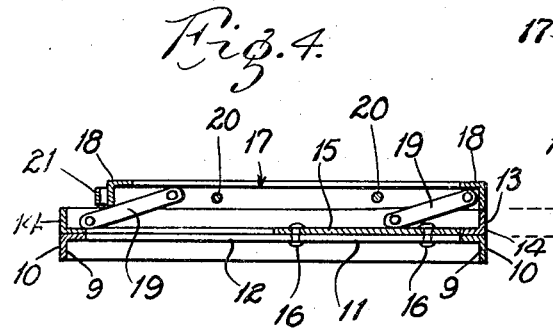
Fig. 4 is a longitudinal sectional elevation of my device taken on the line 4—4 of Fig. 3.

Numeral 26 designates a hook secured to the side frame element of the rectangular elevating frame 17. This hook is of such size that the free end of the arm 22 may be pressed into frictional engagement between it and the side of the rectangular elevating frame 17. The purpose of this hook is to secure the arm 22 in the position shown by dash lines in Fig. 2 selectively.

What I claim and mean to secure by Letters Patent is:

In a device of the character described a frame, a sliding frame operatively secured thereto, an elevating frame, arms, having one of their ends pivotally secured to said sliding frame and the other of their ends secured to said elevating frame, an arm pivotally secured at one end to said elevating frame, a pin secured to said sliding frame, the free end of said arm being notched for engagement with the pin on said sliding frame.

In testimony whereof I affix my signature.

EDWARD W. PAPE.